United States Patent [19]

Toth et al.

[11] Patent Number: 5,339,769

[45] Date of Patent: Aug. 23, 1994

[54] PROCESS FOR MAKING AN ABSORBENT COMPOSITION

[75] Inventors: Cheryl A. Toth; Paul J. Sheskey, both of Midland, Mich.

[73] Assignee: The Dow Chemical Company, Midland, Mich.

[21] Appl. No.: 90,729

[22] Filed: Jul. 13, 1993

[51] Int. Cl.$^5$ .............................................. A01K 1/015
[52] U.S. Cl. .................................................. 119/173
[58] Field of Search ....................... 119/171, 172, 173

[56] References Cited

U.S. PATENT DOCUMENTS

| | | |
|---|---|---|
| 3,636,927 | 1/1972 | Baum . |
| 3,916,831 | 11/1975 | Fisher . |
| 4,085,704 | 4/1978 | Frazier . |
| 4,157,696 | 6/1979 | Carlberg . |
| 4,341,180 | 7/1982 | Cortigene et al. . |
| 4,386,580 | 7/1983 | Johnson . |
| 4,405,354 | 9/1983 | Thomas, II et al. ................ 71/21 |
| 4,407,231 | 10/1983 | Colhorn et al. . |
| 4,409,925 | 10/1983 | Brundrett et al. . |
| 4,424,763 | 1/1984 | Johnson . |
| 4,459,368 | 7/1984 | Jaffee et al. ...................... 502/80 |
| 4,560,527 | 12/1985 | Harke et al. ...................... 264/500 |
| 4,591,581 | 5/1986 | Crampton et al. ................. 502/407 |
| 4,621,011 | 11/1986 | Fleischer et al. .................. 428/221 |
| 4,622,920 | 11/1986 | Goss . |
| 4,638,763 | 1/1987 | Greenberg . |
| 4,657,881 | 4/1987 | Crampton et al. ................. 502/80 |
| 4,685,420 | 8/1987 | Stuart . |
| 4,686,937 | 8/1987 | Rosenfeld . |
| 4,704,989 | 11/1987 | Rosenfeld . |
| 4,727,824 | 3/1988 | Ducharme et al. . |
| 4,844,010 | 7/1989 | Ducharme et al. . |
| 4,881,490 | 11/1989 | Ducharme et al. . |
| 4,883,021 | 11/1989 | Ducharme et al. . |
| 5,000,115 | 3/1991 | Hughes ............................. 119/173 |
| 5,014,650 | 5/1991 | Sowle et al. ....................... 119/171 |
| 5,094,189 | 3/1992 | Aylen et al. ....................... 119/173 |
| 5,094,604 | 3/1992 | Chavez et al. ..................... 425/222 |
| 5,101,771 | 4/1992 | Goss .................................. 119/173 |
| 5,109,804 | 5/1992 | Chikazawa ........................ 119/171 |
| 5,152,250 | 10/1992 | Loeb .................................. 119/171 |
| 5,183,010 | 2/1993 | Raymond et al. ................. 119/173 |
| 5,188,064 | 2/1993 | House ................................ 119/172 |
| 5,193,489 | 3/1993 | Hardin .............................. 119/173 |
| 5,196,473 | 3/1993 | Valenta et al. .................... 524/445 |
| 5,209,185 | 5/1993 | Chikazawa ........................ 119/171 |

FOREIGN PATENT DOCUMENTS

| | | | |
|---|---|---|---|
| 0085939 | 8/1983 | European Pat. Off. ........... 119/171 |
| 0239932 | 10/1987 | Japan ................................ 119/173 |
| 0102618 | 5/1988 | Japan ................................ 119/171 |
| 2092223 | 4/1990 | Japan ................................ 119/171 |
| 2045221A | 10/1980 | United Kingdom . |

*Primary Examiner*—Gene Mancene
*Assistant Examiner*—Todd E. Manahan

[57] ABSTRACT

A process for producing a granular absorbent material by distributing a liquid mixture of a clumping agent substantially uniformly over an inert solid substrate is disclosed. In an alternative process, a free-flowing absorbent material is produced by the process of distributing a liquid mixture of a clumping agent over a blend of a porous inert solid substrate and a water-swellable clumping agent. An absorbent material produced by the process of the present invention is free-flowing and agglomerates upon contact with a liquid.

9 Claims, No Drawings

PROCESS FOR MAKING AN ABSORBENT COMPOSITION

BACKGROUND OF THE INVENTION

The present invention relates to an absorbent composition particularly useful as an animal or pet litter and a process for making the improved absorbent composition.

It is the habit of house-broken animals, such as cats, to deposit their waste material in a specially-provided litter box. Similarly, untrained and caged animals urinate and defecate on the floor of their cage, often in approximately the same floor area of the cage. Litter material useful for collecting the urine and feces of small animals is made of various absorbent compositions and generally contains a large amount of clay and/or cellulosic materials. After a relatively short period of time, the dross-soiled absorbent material emits objectionable odors because of the presence of the urine and fecal matter.

In order to reduce the odors, it is common practice to periodically physically remove the feces from the litter. This results in some reduction in the odors due to the feces, but has no effect on the odors caused by the urine. When the odors from the urine become intolerable, it is a common practice for the homeowner to discard the litter entirely. The homeowner then washes the litter box and refills it with fresh litter.

The most commonly used litter box absorbent materials are clays. Swelling clays are one means for facilitating separation and removal of urine-soaked clay particles from an otherwise fresh bed of animal litter. Such clays expand in volume and become tacky when wetted, forming clumps or agglomerates of spent clay which can be individually removed from the bed. U.S. Pat. No. 5,000,115 describes a method and a composition of absorbing animal dross using a water-swellable bentonite clay. The absorbing composition disclosed in the U.S. Pat. No. 5,000,115 patent requires a sufficient amount of fines for the litter material to clump when wet.

Animal litters which form gelled agglomerates when in contact with excreted animal body fluids are described in U.S. Pat. Nos. 4,685,420 and 5,014,650. U.S. Pat. No. 4,685,420 discloses an animal litter that contains a dry blend of a porous, inert solid substrate, such as particulate clay, and a particulate water-absorbent polymer. The animal litter disclosed in U.S. Pat. No. 5,014,650 is a dry blend of a porous, inert solid substrate, and a dry particulate cellulosic ether as a water-absorbent polymer.

The clumping animal litter facilitates the removal of urine-soaked particles, but the animal litter remains dusty during manufacture as well as when dispensing, particularly when the bulk of the litter is clay. In addition, in animal litters containing a cellulosic ether or water-absorbent polymer, there is the possibility that the cellulosic ether or water-absorbent polymer will segregate from the particulate inert solid substrate during handling and shipping.

To reduce the dust associated with clay containing animal litters, U.S. Pat. No. 5,101,771 discloses an animal litter containing discrete, free-flowing and non-swelling clay particles and a water-soluble organic resin clumping agent in an oleaginous vehicle, such as mineral oil, distributed on the surface of the free-flowing clay particles.

Animal litter has also been produced by mixing clay fines with an adhesive-type binder, such as a water-soluble lignin, and the clay-binder mixture then converted into pellets through the action of a pin-type solids processor as disclosed in U.S. Patent 4,704,989. Fines were defined as a range of particles less than about 40–200 mesh in size. Pellets formed in this manner were reported to have a total surface absorption and total absorption capacity in the open pore spaces approaching the capacity of clay fines. A process for producing animal litter from fines which pass a 30–50 mesh is disclosed is U.S. Pat. No. 4,686,937. The process includes mixing an aqueous solution of lignin with clay fines, transferring the clay-lignin particles to a disc pelletizer having a screw conveyor to feed the particles through a die and then forcing the clay-lignin particles through the die and cutting the coherent mass obtained from the die to form the material into pellets.

U.S. Pat. No. 4,409,925 discloses a method for producing a granular light-weight absorbent material by mixing ground paper, Plaster of Paris and at least one additional component to form a homogeneous mixture, spray applying water droplets to the homogeneous mixture and then mixing the water and mixture to form discrete particles.

Other patents generally dealing with animal litter or absorbent materials include, for example, U.S. Pat. Nos. 4,881,409; 4,591,581; 4,638,763; 4,844,010; 4,021,011; 4,622,920; 4,657,881; 5,152,250; 5,147,877; 4,409,925 and 4,883,021.

Despite the improvements in producing a consumer acceptable animal litter, a need still exists for a litter box absorbent material that effectively collects the urine or other dross material and that agglomerates when wetted to allow physical removal of the wetted litter box absorbent material from the unwetted litter box absorbent material. In addition, the need exits for an effective process for producing a relatively dust-free clumping animal litter that uniformly distributes additives throughout the litter mixture.

SUMMARY OF THE INVENTION

The present invention is a process for producing an absorbent material. The process is particularly useful in producing a free flowing absorbent material useful as a kitty litter, wherein the absorbent material agglomerates upon contact with a liquid. The process for preparation of a free flowing animal litter that clumps upon contact with a liquid comprises:

distributing substantially uniformly over an inert solid substrate an effective amount of a liquid mixture of a clumping agent.

In another embodiment, the invention provides a process for preparation of a free flowing animal litter that agglomerates upon contact with a liquid comprising:

distributing substantially uniformly an effective amount of a liquid mixture of a clumping agent over a dry blend of an inert solid substrate and a water-swellable clumping agent.

The present invention is also an animal litter composition prepared by the process of spraying a mixture of clumping agent substantially uniformly over an inert solid substrate or over a blend of an inert solid substrate and a water-swellable clumping agent.

The present invention also provides an animal litter capable of agglomerating animal urine to facilitate removal of the animal urine from a litter box containing the animal litter, the animal litter comprising an inert solid substrate having distributed substantially uniformly thereon an effective amount of a clumping agent to agglomerate animal urine in the litter box, the agglomerate having sufficient mechanical integrity to be conveyed from the litter box as a discrete entity.

The animal litter produced by the process of the present invention is advantageous in that a litter is produced which has reduced dusting during handling in manufacture and by the consumer. The litter produced by the process of the present invention is also of a more uniform particle size, additives are more uniformly distributed and there is reduced penetration of the agglomerate or clump formed upon wetting into the remaining litter bed. Reduced penetration of the agglomerate into the litter bed results in a smaller amount of unsoiled material being removed during clean-up. The process of the present invention also produces an animal litter that has little segregation during shipping and customer handling.

DETAILED DESCRIPTION OF THE INVENTION

The product of the present invention is a granular absorbent material that has a reduced tendency to generate dust upon handling. The granular absorbent materials are well suited for commercial and residential applications including absorbing lubricants and liquids which are difficult to clean in a conventional manner. The absorbent material is particularly well suited for residential use for animal litter boxes and the like.

The granular absorbent material of the present invention is comprised of a particulate inert solid substrate and a clumping agent distributed on the particulate inert solid material in an amount sufficient to agglomerate the granules when wetted. The granules are free-flowing and have the inert solid substrate as the major constituent. A granular animal litter produced by the process of the present invention is also advantageous in that the process provides for a uniform blend of solids reducing the segregation that can occur during shipping and handling.

Examples of inert solid substrates useful in the present invention include wood chips, wood shaving, wood flour, sawdust, straw, clay porous beads such as those of polyethylene, polypropylene or polystyrene, shredded paper, cloth, alfalfa, cotton, sand, hard ground corn husks, ground sugar cane, lignocellulose, cellulose, calcium silicate and calcium sulfate. Generally the inert solid substrate used in animal litter is clay. Clays useful in animal litter include montmorillonite, kaolinite, illite, halloysite, smectite, hormite, vermiculite, sodium and calcium bentonites, mica, attapulgite, sepiolite, or mixtures thereof. Preferably, the inert solid substrate is a bentonite clay selected from montmorillonite, beidellite, nontronite, hectorite, saponite, attapulgite, sepiolite, or a combination thereof.

The inert solid substrate is usually particulate and generally has a particle size of from about 0.05 to about 10.0 millimeters and preferably from about 0.1 to about 5 millimeters.

The inert solid substrate usually comprises more than about 90 percent (by weight) of the animal litter compositions, and generally greater than 95 percent of the composition.

Clumping agents useful in the present invention promote adhesion of the fine size particles of the substrate to each other during the process of distributing the clumping agent on the inert solid substrate as well as promoting adhesion of the granules to form an agglomerate when wetted. Preferably, the clumping agent allows the formation of a gelled agglomerate when exposed to a liquid, such as animal urine. Suitable clumping agents include vinyl polymers such as polyvinyl alcohol, polyvinyl esters such polyvinyl acetate, polyvinylpyrrolidone, polyvinyloxazolidone, polyvinylmethyloxazolidone, copolymers and mixtures thereof. Natural occurring polymers for use in the present invention include such polymers as gum arabic, gum karaya, gum tragacanth, gum ghatti, guar gum, alginates, carrageenan, pectins, starches, dextran, xanthan gum and gelatin. Semisynthetic polymers useful as clumping agents in the present invention include cellulose ethers and guar gum derivatives. The cellulose ether can be methyl cellulose, hydroxyethyl cellulose, hydroxypropyl cellulose, ethylhydroxyethyl cellulose, methylhydroxypropyl cellulose, carboxymethyl cellulose, hydroxypropylmethylcellulose or mixtures thereof. Preferably, the clumping agent is a cellulose ether. More preferably, the clumping agent is a water-soluble cellulose ether. A combination of various vinyl, natural and semisynthetic polymers can be used as clumping agents in the present invention.

Useful polymers are preferably capable of absorbing many times their own weight of an aqueous fluid such as urine. The formed agglomerates have sufficient mechanical integrity to be conveyed from a litter box as a discrete entity using methods typically used in removing waste product from a litter box such as with implements or manually by hand.

Clumping agents useful in the present invention are commercially available, for example, commercially available cellulose ethers such as methylcellulose A4M and hydroxypropylmethylcellulose J15MS, E15LVP, K4M and K15M, are all available from The Dow Chemical Company. Various starches, including Starch 1500, are available from Colorcon, a division of Berwind Pharmaceutical Services, Inc. As another example, guar gum is available from Aqualon Company.

The process for producing a free flowing animal litter that agglomerates upon contact with a liquid, which is relatively dust-free, comprises distributing substantially uniformly over an inert solid substrate an effective amount of a liquid mixture of a clumping agent. In the process, the clumping agent is first mixed with a liquid vehicle to form a solution or dispersion of the clumping agent. Water is the preferred liquid vehicle as it is an inexpensive medium and avoids the potential hazards of solvents. The resulting dispersion or solution is then distributed over the inert solid substrate by conventional means, such as spraying, to provide a desired clumping agent concentration on the inert solid substrate. As used herein the phrase "liquid mixture of a clumping agent" refers to a solution or dispersion of the clumping agent in a liquid vehicle, preferably water.

The amount of clumping agent used is that which is sufficient to bind the small sized particles of the inert solid substrate and an amount sufficient for rapid agglomeration of the finished product when exposed to an aqueous material. The amount of clumping agent present in the final product should also provide sufficient binding strength for easy separation and disposal of the agglomerate from the remaining unsoiled material.

The clumping agent is generally present in an amount in the range of about 0.01 percent to about 20 percent by weight of the dry weight of the inert substrate. Preferably, the clumping agent is present in the range of about 0.05 to about 10 percent, of the dry weight of the inert substrate. More preferably, the clumping agent is present in an amount from about 0.1 to about 5 percent of the dry weight of the inert substrate.

The concentration of the clumping agent in the solution or dispersion sprayed onto the solid inert substrate is generally adjusted to provide a final moisture content of the animal litter of between about 0.5 to about 40 percent (by weight). Preferably, the moisture content of the animal litter is between about 1 and about 30 percent. More preferably, the final moisture content of the animal litter is between about 2 and about 20 percent.

In still another embodiment of the present invention, clumping agents can be dry blended with the solid inert substrate and then granulated by contact with droplets of a mixture containing an additional clumping agent.

Additional components can also be present in the animal litter produced by the process of the present invention. Additional components which may be added to the animal litter include water-swellable polymers, fragrances, bacteriostates, dyes, anti-fungal agents, and disinfectants. In a preferred embodiment, a water-swellable polymer, such as a polyacrylate disclosed in U.S. Pat. No. 4,685,420, the disclosure of which is hereby incorporated by reference, is mixed with the inert solid substrate. The water-swellable polymer efficiently wick the liquid wastes and entraps them. When present, the water-swellable polymer generally constitutes between about 0.01 and about 30 percent dry weight of inert substrate. Preferably, the water swellable polymer is present in the animal litter between about 0.02 and about 20 percent and, more preferably, between about 0.03 and about 15 percent.

The animal litter can also include compounds which are helpful in odor control. For example, nitrogenous compound absorbers, such as cyclodextrin, disclosed in U.S. Patent 4,844,010, the disclosure of which is hereby incorporated by reference, is reported to be effective in reducing odors associated with animal litter. Other odor-inhibiting compounds useful in the present invention include, for example, camphane derivatives as disclosed in U.S. Pat. No. 3,636,927, the disclosure of which is hereby incorporated by reference.

The clumping agent will promote adhesion of various additives to the inert substrate as well as adhesion of the inert substrate particles to each other. As the clumping agent promotes adhesion of the various particles, the term "over" or "thereon" in reference to distribution of the clumping agent includes distribution on individual particles and distribution on or within a granule produced by-adhesion of particles of the inert substrate and granules of inert substrate with other additives.

Conventional equipment and methods used for granulation technology, such as fluidized bed granulation, high or low shear granulation or roller compaction can be used to produce the animal litter of the present invention. The clumping agent is substantially uniformly distributed over the inert substrate and other additives by conventional equipment. Preferably, the animal litter is produced in a fluid bed granulator.

The invention will be further clarified by a consideration of the following examples, which are intended to be purely exemplary of the present invention.

EXAMPLE 1

A Glatt fluid bed granulator is charged with 1,000 g of bentonite clay (90 percent of the particles being greater than 420 microns) and 10 g of a cellulose ether (METHOCEL TM K15M Premium, a cellulose ether having a viscosity of 15,000 centipoise (cps) as a 2 percent aqueous solution). The granulator is started and the product temperature is brought up to 40° C. (outlet temperature). When the outlet temperature reaches 40° C., atomized water is sprayed onto the moving powders within the granulator. During the granulation process, inlet air temperature is maintained at 70° to 80° C.; air atomization pressure is 28–35 psi; and the spraying cycle is for 45 seconds with a 15 second shaking time.

The clay/cellulose ether agglomerates well over time. The water hydrates the cellulose ether polymer which produces adhesion to from the granule. The formation of the granule promotes aggregation of the small sized particles of the inert substrate, e.g., clay particles of about 50 to 600 microns. The formation of a granule significantly reduces the quantity of dust in the final product while the litter forms an agglomerate when wetted.

EXAMPLE 2

The procedure of Example 1 is followed, except a 1 percent (by weight) solution of a cold water dispersible cellulose ether (METHOCEL TM E50S, a cellulose ether having a viscosity of 50 cps as a 2 percent aqueous solution) is sprayed onto the moving powders rather than atomized water. The resulting granule has good clumping strength and has a substantial reduction in the quantity of dust versus the starting clay material. The amount of cellulose ether in the final product is approximately 1 percent of the dry weight.

EXAMPLE 3

A Glatt fluid bed granulator is charged with 1,000 g of bentonite clay, the granulator started, and when the temperature reaches 40° C. a 1 percent by weight cellulose ether (METHOCEL E50S) solution in water is sprayed onto the moving powder. The final product contains approximately 0.5 percent dry weight cellulose ether. The resulting granule has good clumping strength and has a substantial reduction in the quantity of dust versus the starting clay.

EXAMPLE 4

A Glatt fluid bed granulator is charged with 1,000 g of bentonite clay, 5.0 g starch (Starch 1500 from Colorcon) and 5.0 g of a polyacrylate (DRYTECH TM, from The Dow Chemical Company). The procedure of Example 3 is followed to produce a final product containing 0.5 percent dry weight cellulose ether. The resulting granule has good clumping strength and has a substantial reduction in the quantity of dust versus the starting dry components.

EXAMPLE 5

A Glatt fluid bed granulator is charged with 1,000 g of bentonite clay, 5.0 g starch (Starch 1500 from Colorcon), 5.0 g of a polyacrylate (DRYTECH TM, from The Dow Chemical Company) and 2.5 g of a cellulose ether (METHOCEL TM K15M Premium). The procedure of Example 3 is followed to produce a final product containing approximately 0.75 percent dry weight cellulose ether. The resulting granule has good clumping strength and has a substantial reduction in the quantity of dust versus the starting dry components.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

What is claimed is:

1. A process for preparation of a free flowing absorbent material that agglomerates upon contact with a liquid comprising:

distributing substantially uniformly over a dry blend of a porous inert solid substrate and a water-swellable clumping agent an effective amount of a liquid mixture of a clumping agent.

2. The process of claim 1 wherein the solid inert substrate is a clay.

3. The process of claim 2 wherein the clay bentonite clay.

4. The process of claim 1 wherein the clumping agent is a vinyl polymer, guar gum, cellulose ether, starch, gelatin, xanthan gum or a combination thereof.

5. The process of claim 4 wherein the clumping agent is a cellulose ether.

6. The process of claim 5 wherein the cellulose ether is water soluble.

7. The process of claim 1 wherein the clumping agent is 0.01 to 20 percent dry weight of the substrate.

8. The process of claim 1 wherein the water-swellable clumping agent is polyacrylate.

9. The process of claim 8 wherein the polyacrylate is about 0.01 to about 30 percent dry weight of the animal litter.

* * * * *